(12) United States Patent
Yip

(10) Patent No.: US 9,440,522 B2
(45) Date of Patent: Sep. 13, 2016

(54) PROTECTION DEVICE FOR A VEHICLE WINDOW

(71) Applicant: Leland Yip, Toronto (CA)

(72) Inventor: Leland Yip, Toronto (CA)

( * ) Notice: Subject to any disclaimer, the term of this patent is extended or adjusted under 35 U.S.C. 154(b) by 0 days.

(21) Appl. No.: 14/941,964

(22) Filed: Nov. 16, 2015

(65) Prior Publication Data

US 2016/0221429 A1 Aug. 4, 2016

(30) Foreign Application Priority Data

Feb. 4, 2015 (CA) ..................... 2880935

(51) Int. Cl.
*B60J 11/06* (2006.01)
*B60J 11/08* (2006.01)

(52) U.S. Cl.
CPC ..................... *B60J 11/08* (2013.01)

(58) Field of Classification Search
CPC ....................................................... B60J 11/08
USPC ................. 160/370.21, 351, DIG. 2, DIG. 3; 296/136.13, 95.1, 97.7, 97.8
See application file for complete search history.

(56) References Cited

U.S. PATENT DOCUMENTS

| | | | |
|---|---|---|---|
| 2,551,052 A | 4/1949 | Quish et al. | |
| 2,599,066 A | 6/1950 | Osborn | |
| 3,033,281 A | 5/1962 | Monin | |
| 4,607,875 A * | 8/1986 | McGirr | B60J 1/2011 248/205.5 |
| 4,815,784 A | 3/1989 | Zheng | |
| 5,553,908 A | 9/1996 | Shink | |
| 5,615,923 A | 4/1997 | Madison | |
| 5,927,793 A | 7/1999 | McGrath, Jr. | |
| 6,276,742 B1 | 8/2001 | Deng et al. | |
| 7,673,924 B1 | 3/2010 | Lau | |
| 7,823,953 B2 | 11/2010 | Haas | |
| 7,931,325 B2 * | 4/2011 | Robbins | B60J 11/08 296/136.13 |
| 2013/0248665 A1 * | 9/2013 | Koklamanis | H04N 5/00 248/206.3 |
| 2013/0300149 A1 | 11/2013 | Dao | |

FOREIGN PATENT DOCUMENTS

CN 203611708 U 5/2014

OTHER PUBLICATIONS

NPL_1_Classic_Accessories_Winter_Windshield_Cover.
NPL_2_Winter_Warrior_Windshield_Cover.

(Continued)

*Primary Examiner* — Dennis H Pedder
(74) *Attorney, Agent, or Firm* — Bereskin & Parr LLP/S.E.N.C.R.L., s.r.l.

(57) ABSTRACT

A device for protecting a window of a vehicle from environmental conditions includes a water resistant cover for covering the window. The cover has a first side portion positionable to cover a driver's side of the window, and an opposed second side portion positionable to cover a passenger's side of the window. A frame supports the cover and includes spaced apart and resiliently flexible first and second frame members. The first and second frame members each extend widthwise with respect to the cover across at least a portion of the first side portion and at least a portion of the second side portion. The frame is collapsible to reconfigure the device from a deployed state wherein the frame supports the cover in a generally flat state to a storage state wherein the cover is folded. Fasteners are secured to the cover for mounting the device to the window.

39 Claims, 11 Drawing Sheets

(56) References Cited

OTHER PUBLICATIONS

NPL_3_Reflective_Windshield_Sunshade_with_Suction_Cups.
NPL_4_Hopkins_Go_Gear_Pop_Up_Window_Shade_Rear_Windshield.
NPL_5_Windshield_Car_Pop_Up_Sun_Shade.
NPL_6_Amazon.com_Car_Window_Shade_For_Windshield_(Skorch_Car_Window_Shade).
NPL_7_Neverfrost_Canadian_Startup_Aims_To_Make_Scraping_Ice_Off Windshield (Website—huffingtonpost.ca/en2015/01/27/65544200.

* cited by examiner

PROTECTION DEVICE FOR A VEHICLE WINDOW

CROSS REFERENCES TO RELATED APPLICATIONS

This application claims priority from Canadian Patent Application No. 2,880,935, filed on Feb. 4, 2015, which is incorporated herein by reference in its entirety.

FIELD

The disclosure relates to devices for protecting vehicle windows from environmental conditions, such as snow and ice. More specifically, the disclosure relates to such devices that may be secured to a vehicle window and that cover the vehicle window.

BACKGROUND

U.S. Pat. No. 2,599,066 (Osborn) purports to disclose a windshield cover that includes an elongated fabric panel, together with suction cups disposed thereon to facilitate the placement of the cover upon the windshield while the doors are moved into a closed position clamped against certain parts of the device to hold the fabric panel in a taut condition.

U.S. Pat. No. 7,931,325 (Robbins) purports to disclose a windshield protection and ice removal device that comprises a pair of generally rectangular flexible wire frames enclosed by and supporting a nylon fabric coated by an outer layer of polyvinyl chloride. There are also a pair of opposed side view mirror "gloves" having expandable "wrists" and which are designed to enclose a vehicle's side view mirrors, for securing the invention to the vehicle in a manner resistant to wind effects which might otherwise lift the cover from the windshield. Finally, the preferred embodiment also comprises a wire-connected belt terminating in a buckle which is designed to be trapped inside a vehicle's interior by the vehicle's door or side window to render the invention resistant to unauthorized removal from the vehicle's windshield. A relatively thick, cut-resistant wire runs through the belt to make it more difficult to cut the belt and sever it from the rest of the shield device.

SUMMARY

The following summary is intended to introduce the reader to various aspects of the applicant's teaching, but not to define any invention.

Various protection devices, and related combinations of protection devices and vehicles are disclosed herein.

According to one aspect, a protection device comprises a water resistant cover for covering a vehicle window. The cover has a cover first side portion positionable to cover a driver's side of the window, and a cover second side portion opposed to the cover first side portion and positionable to cover a passenger's side of the window. A frame supports the cover and comprises a resiliently flexible first frame member and a resiliently flexible second frame member spaced from the first frame member. The first frame member and second frame member each extend widthwise with respect to the cover across at least a portion of the cover first side portion and at least a portion of the cover second side portion. The frame is collapsible to reconfigure the protection device from a deployed state wherein the frame supports the cover in a generally flat state to a storage state wherein the cover is folded. A plurality of fasteners are secured to the cover for mounting the protection device to the window.

In some examples, the cover may have a cover bottom portion positionable to cover a bottom portion of the window and an opposed cover top portion positionable to cover a top portion of the window. The first frame member may be secured to the cover bottom portion, and the second frame member may be secured to the cover top portion.

In some examples, the first frame member may comprise a first ring extending widthwise with respect to the cover across at least a portion of the cover first side portion and at least a portion of the cover second side portion, and the second frame member may comprise a second ring extending widthwise with respect to the cover across at least a portion of the cover first side portion and at least a portion of the cover second side portion.

In some examples, the first frame member and second frame member may each extend across a majority of the cover first side portion and a majority of the cover second side portion. For example, the first frame member and second frame member each may extend widthwise across substantially the entirety of the cover first side portion and substantially the entirety of the cover second side portion.

In some examples, the cover may have a cover maximum width, the first frame member may have a first frame member width, and the second frame member may have a second frame member width. The first frame member width and second frame member width may be at least 60% of the cover maximum width, at least 75% of the cover maximum width, or at least 90% of the cover maximum width.

In some examples, the first ring and second ring may be oval. The first ring and second ring may be fabricated from steel. The steel of the first ring and second ring may have a diameter of at least ¹⁄₁₆th of an inch (about 1.6 mm).

In some examples, the protection device may comprise a frameless central portion between the first frame member and the second frame member, and the cover may be foldable at the frameless central portion so that the first frame member lies on the second frame member. The protection device may be reconfigurable from the deployed state by folding the cover at the frameless central portion so that the first frame member lies on the second frame member, and twisting the frame into a plurality of stacked loops.

In some examples, the cover may be generally continuous and may comprise a plurality of panels. At least one of the panels may be fabricated from nylon.

In some examples, the cover may comprise an inside face for facing the window, and the inside face may comprise a heat reflective material.

In some examples, the protection device may further comprise a lock for securing the frame in the storage state. When the lock is removed, the frame may automatically configure towards the deployed state.

In some examples, the cover may comprise a first sleeve in which the first frame member is received, and a second sleeve in which the second frame member is received.

In some examples, the first frame member may comprise a frame member bottom portion positionable adjacent a hood of the vehicle. The protection device may further comprise a shield surrounding the frame member bottom portion for shielding the hood from the frame member bottom portion. The shield may comprise a plastic sheath in which the frame member bottom portion is received.

In some examples, the fasteners may be suction cups securable to the window. The suction cups may be locking suction cups.

In some examples, the cover may have a periphery, and the suction cups may be spaced inwardly of the periphery for mounting directly to an exterior surface of the window. The first frame member may comprise a first ring, the second frame member may comprise a second ring, and each suction cup may be positioned within one of the first ring and the second ring.

In some examples, the frame may be twistable into a plurality of stacked loops to reconfigure the frame from the deployed state to the storage state. The protection device may have a deployed footprint when in the deployed state, and a storage footprint when in the storage state, and the storage footprint may be about one sixth (⅙) of the deployed footprint.

According to another aspect, a combination comprises a window of a vehicle and a protection device mounted to the window. The window has a window driver's side, a window passenger's side opposed to the window driver's side in a widthwise direction, and a window exterior surface. The protection device protects the window exterior surface from environmental conditions. The protection device comprises a water resistant cover covering the window. A frame supports the cover and comprises a resiliently flexible first frame member. The first frame member extends widthwise with respect to the cover across at least a portion of the window passenger's side and at least a portion of the window driver's side. A plurality of fasteners are secured to the cover and mount the protection device to the window.

In some examples, the frame may further comprise a resiliently flexible second frame member spaced from the first frame member. The second frame member may extend widthwise with respect to the cover across at least a portion of the window passenger's side and at least a portion of the window driver's side.

In some examples, the combination may further comprise a vehicle hood. The first frame member may comprise a frame member bottom portion positionable adjacent the vehicle hood. The protection device may further comprise a shield surrounding the frame member bottom portion and shielding the hood from the frame member bottom portion.

In some examples, the combination may further comprise a vehicle wiper well. The first frame member may comprise a frame member bottom portion positionable below the vehicle wiper well. The cover may comprise a cover bottom portion protecting the wiper well from environmental conditions.

In some examples, the protection device may be mounted directly to the window exterior surface. The fasteners may comprise suction cups mounting the protection device directly to the window exterior surface.

According to another aspect, a combination comprises a window of a vehicle, at least one wiper for wiping the window, and a protection device. The window has an exterior surface. The wiper defines a wiper sweep area on the exterior surface of the window. The protection device is mounted to the window for protecting the window from environmental conditions. The protection device comprises a water resistant cover covering the window, a frame secured to the cover and supporting the cover, and a plurality of suction cups secured to the cover and mounting the protection device to the exterior surface of the window. At least some of the suction cups are mounted to the wiper sweep area of the window.

In some examples, the cover may comprise a cover periphery, and the suction cups may be positioned inwardly of the cover periphery. The frame may comprise a plurality of rings, and each suction cup may be positioned within one of the rings. The cover may comprise a cover first side portion positionable to cover a driver's side of the window, and a cover second side portion opposed to the cover first side portion and positionable to cover a passenger's side of the window. Each ring may extend widthwise with respect to the cover across at least a portion of the cover first side portion and at least a portion of the cover second side portion.

In some examples, each of the rings may be resiliently flexible. The frame may be collapsible to reconfigure the protection device from a deployed state wherein the cover is generally flat to a storage state wherein the cover is folded.

In some examples, the suction cups may be locking suction cups.

According to another aspect, a protection device for protecting a window of a vehicle from environmental conditions comprises a water resistant cover for covering the window. The cover has a cover first side portion positionable to cover a driver's side of the window, a cover second side portion opposed to the cover first side portion and positionable to cover a passenger's side of the window, a cover bottom portion positionable to cover a bottom portion of the window, an opposed cover top portion positionable to cover a top portion of the window, and a cover periphery. A frame supports the cover, and comprises a resiliently flexible first ring and a resiliently flexible second ring. The first ring and second ring each extend widthwise with respect to the cover across at least a portion of the cover first side portion and at least a portion of the cover second side portion. The ring is secured to the cover bottom portion, and the second ring is secured to the cover top portion. The frame is collapsible to reconfigure the protection device from a deployed state wherein the frame supports the cover in generally flat state to a storage state wherein the cover is folded. A plurality of suction cups are secured to the cover for mounting the protection device to the window. The suction cups are positioned within the periphery of the cover.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such apparatus or process by its disclosure in this document.

Figure 1:
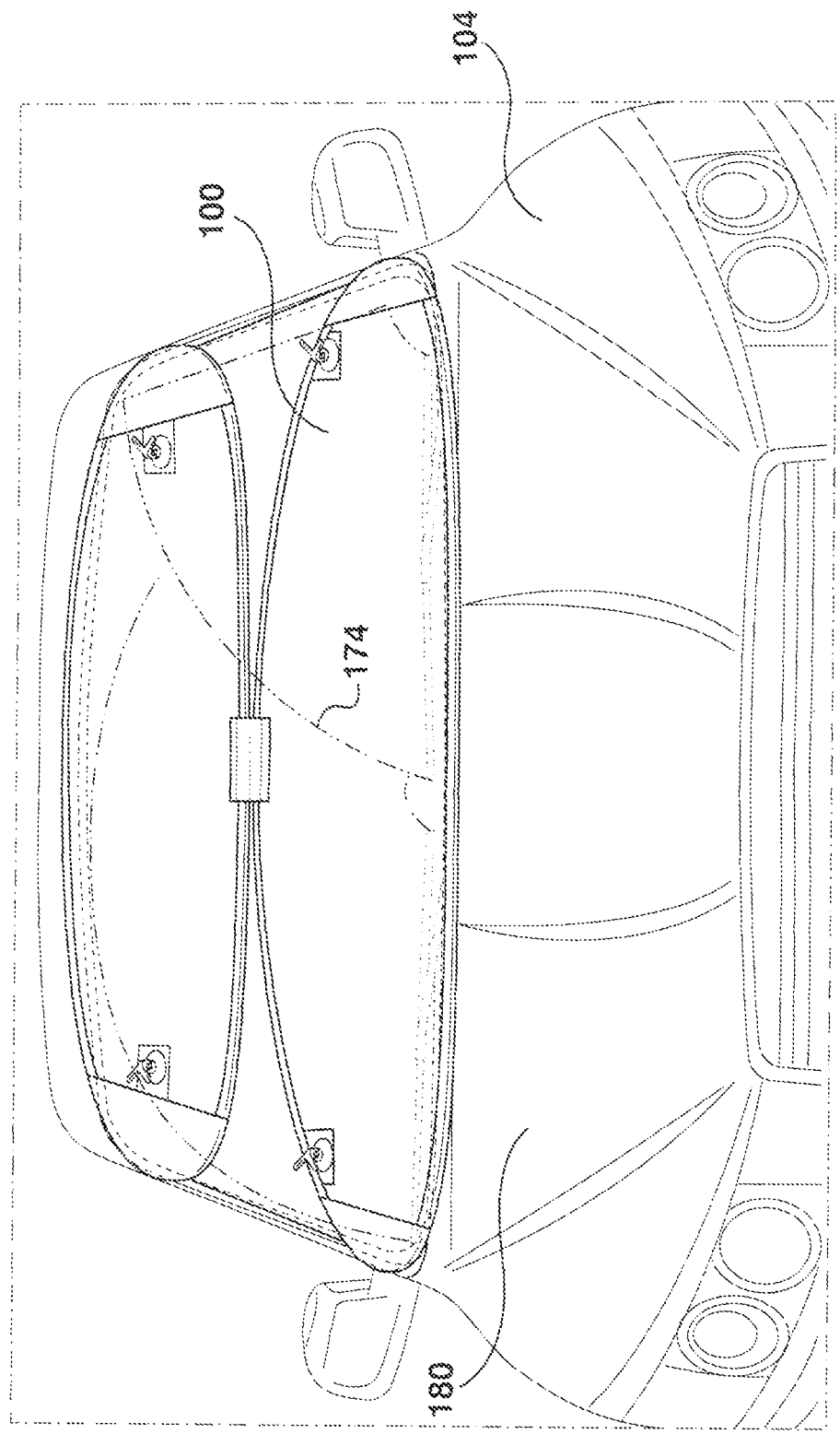
FIG. 1 is a front view of a vehicle, with a protection device secured to a front windshield of the vehicle.
Figure 2:
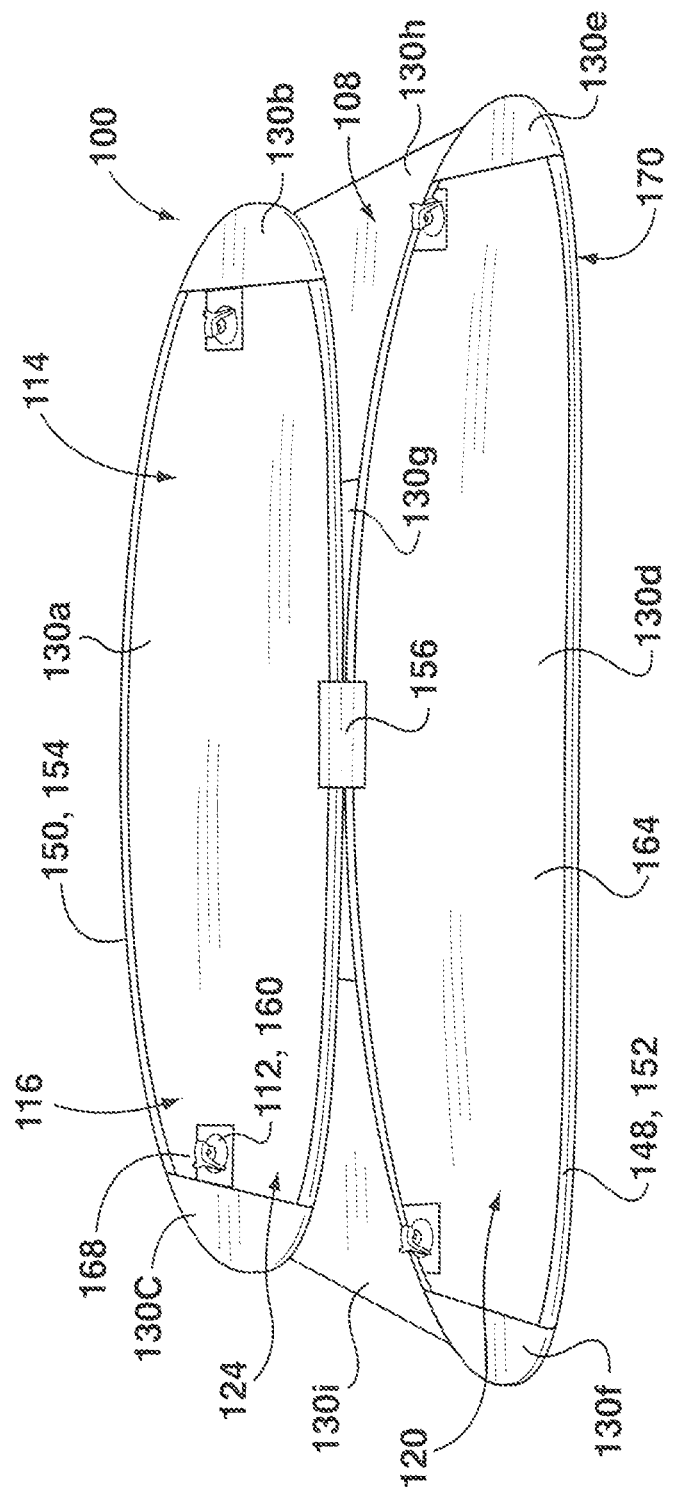
FIG. 2 is a perspective view of the protection device of FIG. 1.

Referring to FIG. 1, an example protection device 100 (also referred to herein as "device 100") is shown. The device 100 is shown secured to a window 102 (labelled in FIG. 6) of a vehicle 104, for protecting the window 102 from environmental conditions. In the example shown, the window 102 is a front windshield.

The device 100 may protect the window 102, and more specifically the exterior surface 106 (labelled in FIG. 6) of the window 102, from various environmental conditions. For example, the environmental conditions may include winter conditions such as snow, ice, frost, and/or slush. Alternatively, the environmental conditions may include, but are not limited to, dirt, dust, bugs, leaves, animal droppings, and/or animals.

The device 100 is removably securable to the window 102, as will be described in further detail below. When secured to the window 102, the device 100 generally covers the window 102 to thereby protect it from the environmental conditions. For example, in winter conditions, by covering the window 102, the device 100 may generally prevent, inhibit, or reduce snow and/or ice from building up on the window 102 and/or the wipers of the window 102, and therefore obviate or reduce the need for scraping and/or brushing of the window 102 to remove snow and/or ice.

The device 100 may be secured to the window 102 as needed or as desired by a user. For example, the device 100 may be secured to the window 102 upon parking the vehicle 104 outdoors.

Referring now to FIGS. 2 to 5, in the example shown, the device 100 includes a water resistant cover 108, a frame 110 supporting the cover 108, and a plurality of fasteners 112 secured to the cover 108 for mounting the device 100 to the window 102.

Referring still to FIGS. 2 to 5, in the example shown, the cover 108 is sized and shaped to cover generally all of the front windshield, and is generally continuous (i.e. does not include holes or gaps therein through which substantial amounts of material such as snow may pass). Furthermore, in the example shown, the cover 108 is slightly larger than the front windshield. The cover 108 generally includes a cover first side portion 114 positionable to cover a driver's side 115 (shown in FIG. 6) of the window 102, a cover second side portion 116 opposed to the cover first side portion 114 and positionable to cover a passenger's side 117 (shown in FIG. 6) of the window 102, a cover bottom portion 120 positionable to cover a bottom portion 122 (shown in FIG. 6) of the window 102, and an opposed cover top portion 124 positionable to cover a top portion 126 (shown in FIG. 6) of the window 102.

The cover 108 may be fabricated from any suitable water resistant material, including but not limited to woven fabrics, non-woven fabrics, natural fabrics, synthetic fabrics, polymer membranes, and/or combinations thereof. As used herein, the term "water resistant" includes materials through which substantial amounts of water may generally not pass, under normal environmental conditions, for example during winter conditions. In one particular example, the cover 108 is fabricated from nylon, and more specifically rip-stop nylon. In some examples, the cover 108 may include a water repellent coating. Furthermore, in some examples, the cover may include a heat reflective material 127 on the inside face 128 thereof. The heat reflective material 127 may aid in warming of the window 102 and/or windshield wipers, to facilitate drying of the window 102 and/or windshield wipers.

Figure 5:
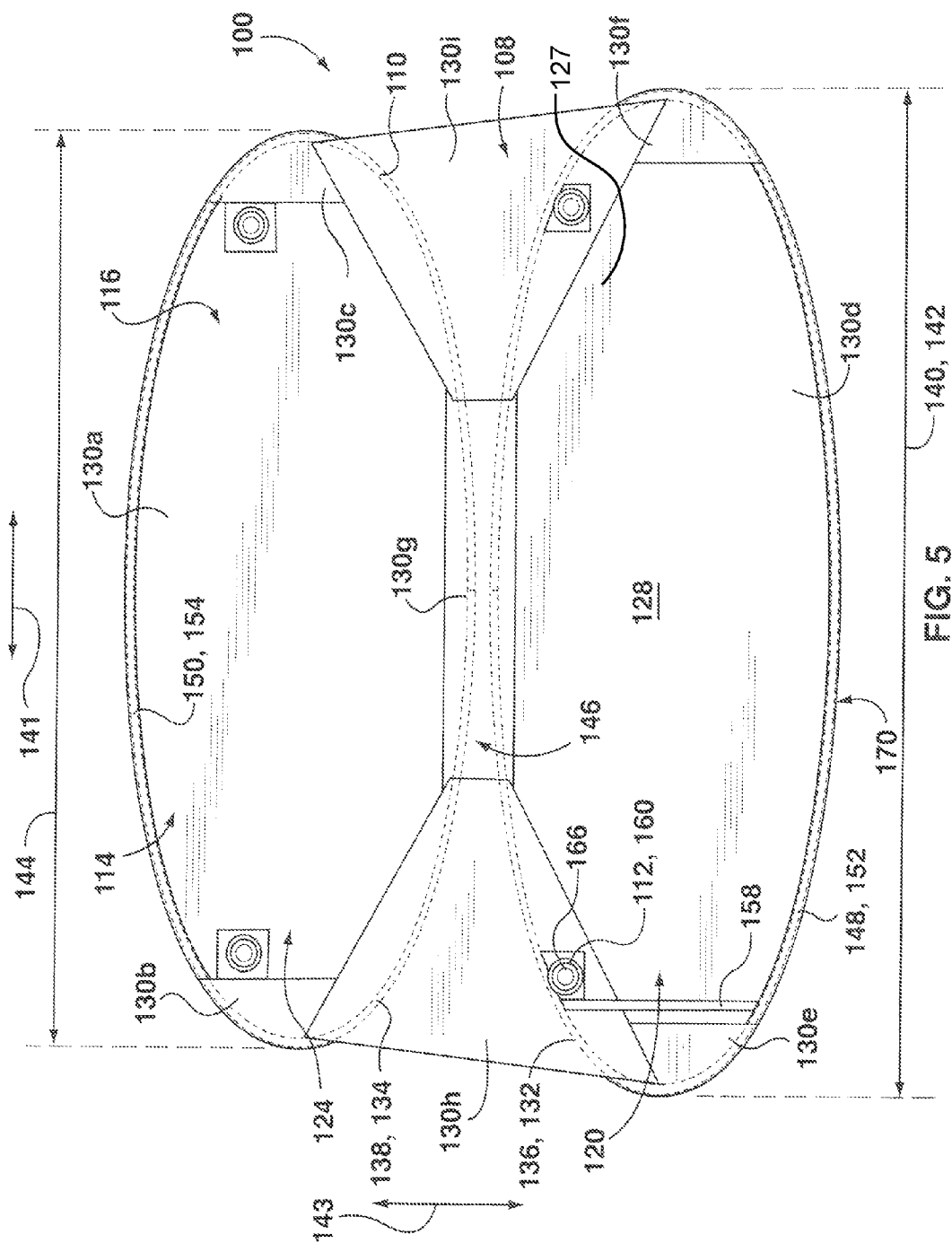
FIG. 5 is a rear plan view of the protection device of FIG. 1, with first and second frame members shown in dotted line.

Referring to FIG. 5, in the example shown, the cover 108 includes a plurality of separately formed panels 130a-130i, which are attached together. For example, the panels 130a-130i may be fabric panels that are sewn together. In one particular example, one or more of the panels 130a-130i may be fabricated from nylon. In alternative examples, the cover may include only a single panel.

Figure 3:
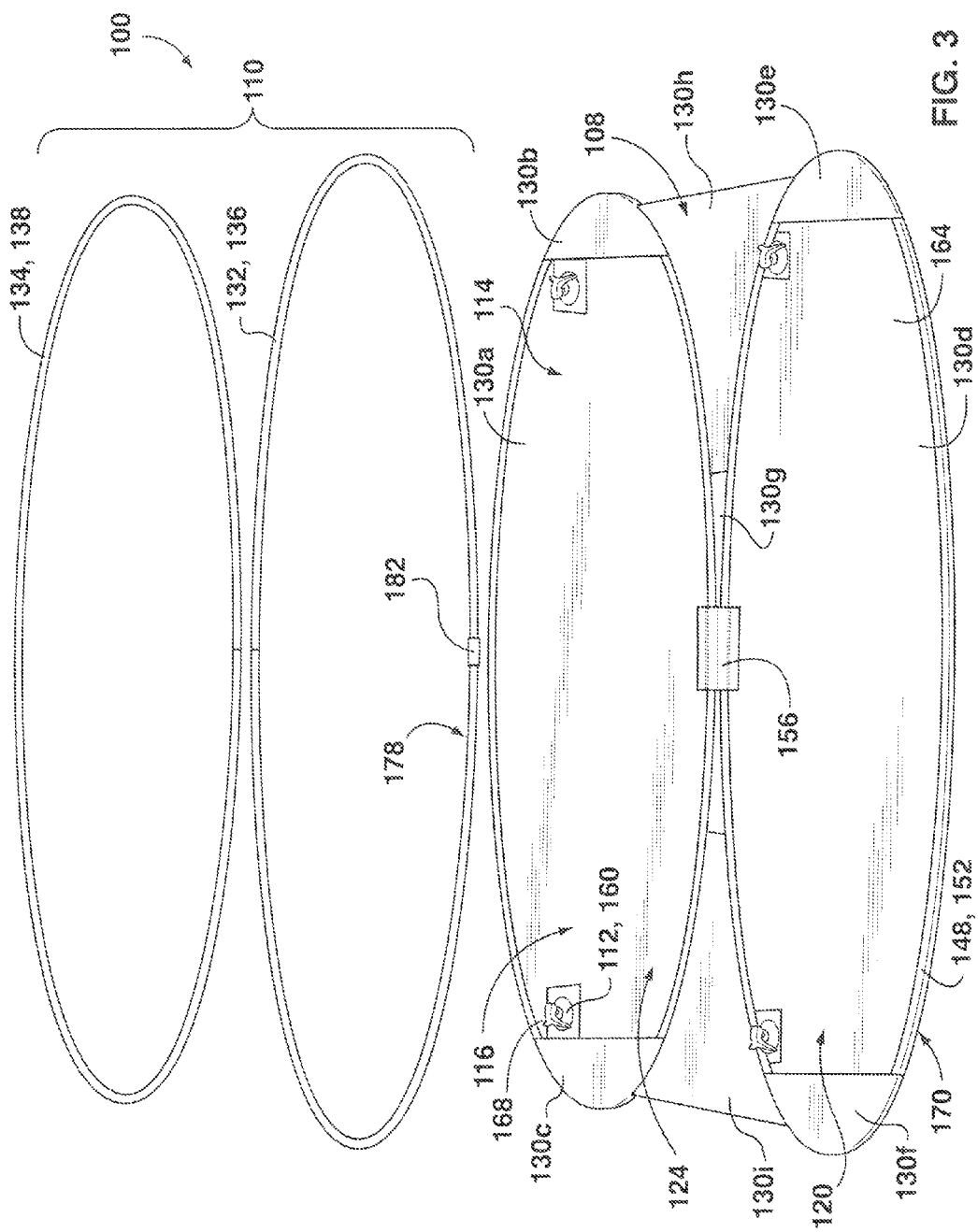
FIG. 3 is an exploded view of the protection device of FIG. 1.
Figure 4:
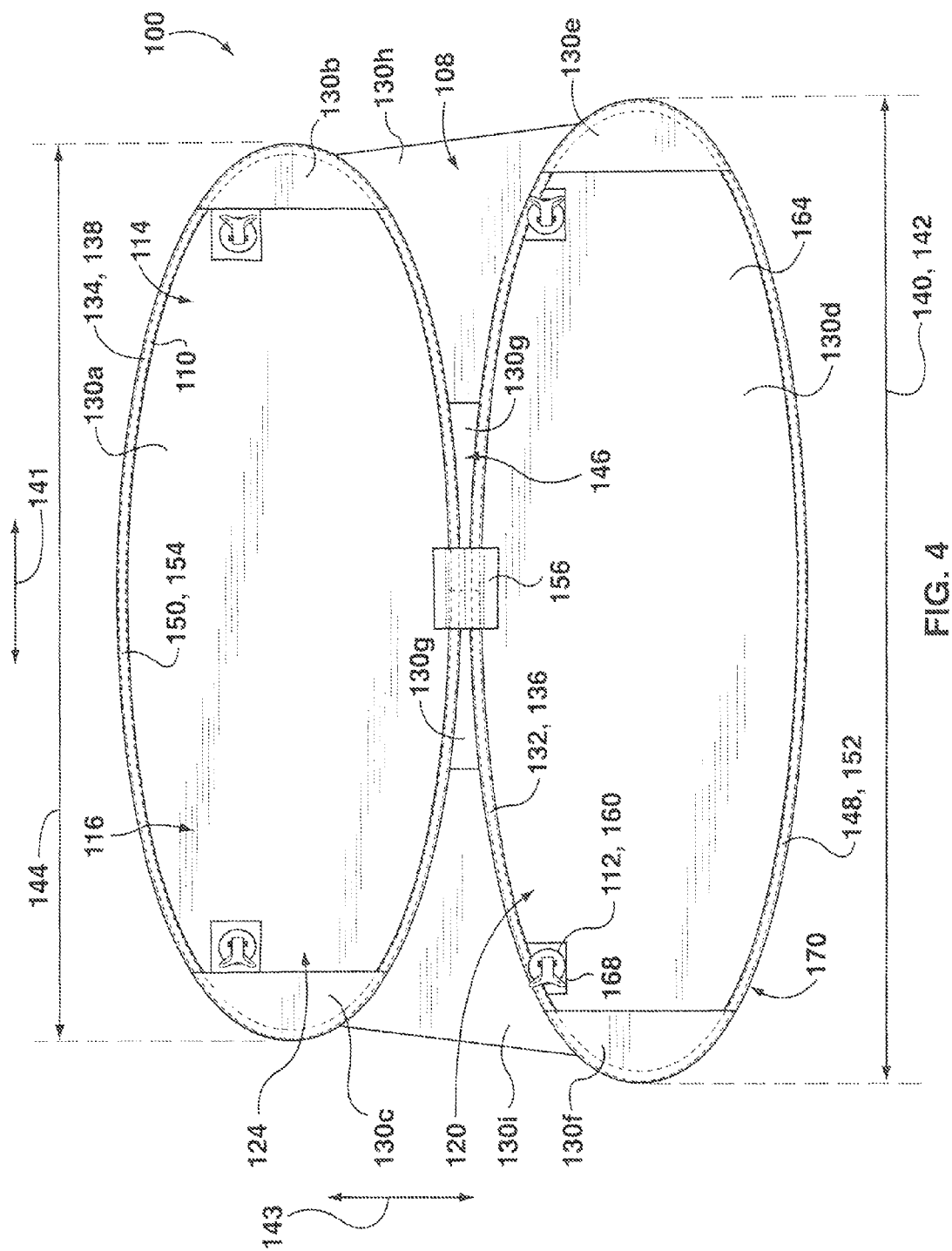
FIG. 4 is a front plan view of the protection device of FIG. 1, with first and second frame members shown in dotted line.

Referring to FIGS. 3 to 5, in the example shown, the frame 110 supports the cover 108, and as will be described in further detail, is collapsible to reconfigure the device 100 from a deployed state wherein the frame 110 supports the cover 108 in a generally flat state, to a storage state wherein the cover 108 is folded. In the device 100, the frame 110 is generally hidden within the cover, and is not visible; however, to aid in understanding, the frame 110 is shown in dotted line in FIGS. 4 and 5.

Referring still to FIGS. 3 to 5, in the example shown, the frame 110 includes a first frame member 132 and a second frame member 134 spaced from the first frame member 132. The first frame member 132 includes a first ring 136 that is generally oval, and the second frame member 134 includes a second ring 138 that is generally oval.

The first frame member 132 and the second frame member 134 may each extend widthwise with respect to the cover 108 (the direction of the width is identified by arrow 141 in FIGS. 4 and 5) across at least a portion of the cover first side portion 114 and at least a portion of the cover second side portion 116. More specifically, the first ring 136 may extend widthwise with respect to the cover 108 across at least a portion of the cover first side portion 114 and at least a portion of the cover second side portion 116, and the second ring 138 may extend widthwise with respect to the cover 108 across at least a portion of the cover first side portion 114 and at least a portion of the cover second side portion 116. Furthermore, in use, when the device 100 is mounted to window 102, the first frame member 132 and second frame member 134 may each extend across at least a portion of the window passenger's side 115 and at least a portion of the window driver's side 117.

For example, the first frame member 132 and second frame member 134 may each extend across a majority of the cover first side portion 114 and a majority of the cover second side portion 116. More specifically, referring to FIGS. 4 and 5, the cover 108 has a cover maximum width 140, the first frame member 132 has a first frame member width 142, and the second frame member 134 has a second frame member width 144. The first frame member width 142 and second frame member width 144 may be at least 50% of the cover maximum width 140, at least 60% of the cover maximum width 140, at least 75% of the cover maximum width 140, or at least 90% of the cover maximum width 140. In the example shown, the first frame member 132 and second frame member 134 each extend widthwise across substantially the entirety of the cover first side portion 114 and substantially the entirety of the cover second side portion 116, and the first frame member width 142 is about equal to the cover maximum width 140, and the second frame member width 144 is about 90% of the cover maximum width.

Referring still to FIGS. 4 and 5, in the example shown, the first frame member 132 and second frame member 134 are spaced apart in a direction (identified by arrow 143 in FIGS. 4 and 5) transverse to the direction of the width 141, and the first frame member 132 is secured to the cover bottom portion 120 and the second frame member 134 is secured to the cover top portion 124. The cover 108 includes a frameless central portion 146 between the first frame member 132 and the second frame member 134. As will be described in further detail below, the cover 108 is foldable at the frameless central portion 146.

The first frame member 132 and second frame member 134 may be secured to the cover 108 in a variety of ways. Referring to FIGS. 2 to 5, in the example shown, the cover 108 includes a first sleeve 148 in which the first frame member 132 is received, and a second sleeve 150 in which the second frame member 134 is received. The first sleeve 148 and second sleeve 150 are each formed by a strip of fabric 152 and 154 respectively, that is sewn to the panels of cover 108. The strips of fabric 152, 154 may be, for example, bias tape, for example rip-stop nylon bias tape. Each strip of fabric 152, 154 is sewn along its length to the panels to form a sleeve having an oval ring shape, in which one of the respective frame members 132, 134 is received.

The first 132 and second 134 frame members may be, for example, provided as elongate wires which are threaded into the first 148 and second 150 sleeves respectively via an opening (not shown) in each of the first 148 and second 150 sleeves, respectively. After threading the first 132 and second 134 frame members into the first 148 and second 150 sleeves, respectively, each of the first 132 and second 134 frame members may be secured in the ring shape by fastening opposed ends of each respective wire together. For example, the opposed ends may be secured together with a fastener or an adhesive (not shown). In the example shown, the cover 108 further includes an access flap 156 that covers the opening in the first 148 and second 150 sleeves, and that may be opened to access the first 132 and second 134 frame members.

In alternative examples, the first frame member and second frame member may be of another shape or configuration.

In the example shown, both the first frame member 132 and second frame member 134 are resiliently flexible, which allows for the frame 110 to be collapsed to the storage state and to pop-up towards the deployed state. More specifically, in the example shown, the first ring 136 and second ring 138 are fabricated from steel, particularly stainless steel. The steel may have a diameter of about or at least 1/16 of an inch (about 1.6 mm).

Furthermore, in the example shown, the frame is sufficiently stiff to hold the cover in a generally flat state across the width of the cover, but is also sufficiently flexible to allow the frame to flex to accommodate any curvature in the windshield, and/or vehicle.

Figure 7A:
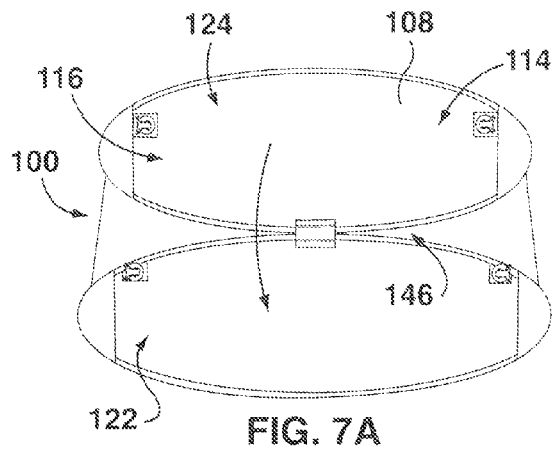
FIGS. 7A to 7F show a series of steps for collapsing the protection device of FIG. 1 from a deployed state to a storage state.
Figure 7D:
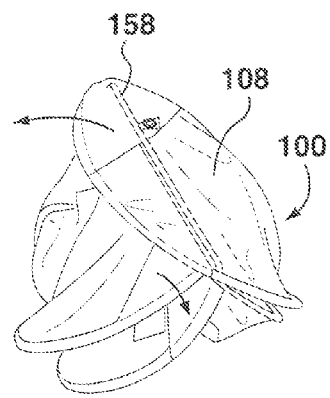
Figure 7B:
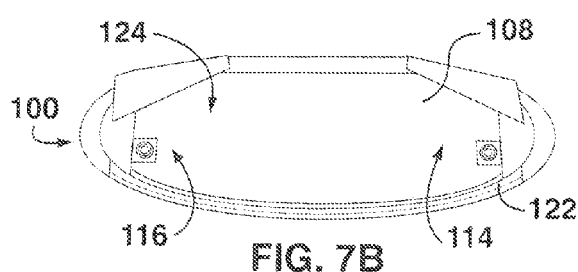
Figure 7E:
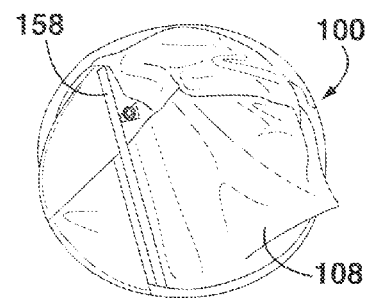
Figure 7C:
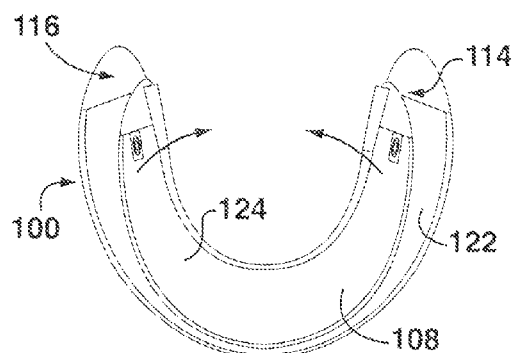

An example method of collapsing the device 100 will presently be described. Referring to FIGS. 7A to 7F, in the example shown, in order to collapse the device 100 from the deployed state (shown in FIG. 7A) to the storage state (shown in FIG. 7F), the cover 108 may first be folded inward along its length at the frameless central portion 146, so that the second frame member 134 lies on the first frame member 132 (or vice versa), and the top portion 124 of the cover 108 lies on the bottom portion 122 of the cover 108 (or vice versa), as shown in FIG. 7B. The device 100 may then be bent by bringing the cover first side portion 114 towards the cover second side portion 116, as shown in FIG. 7C. During bending, the first frame member 132 and second frame member 134 will twist and collapse into a plurality of stacked loops, and the cover 108 will fold as the first 132 and second 134 frame members collapse, as shown in FIGS. 7D and 7E. More specifically, the first 132 and second 134 frame member will each collapse into three stacked loops, so that the device 100 is of a more convenient size for storage. In the example shown, the device 100 has a deployed footprint when in the deployed state, and a storage footprint when in the storage state, and the storage footprint is about 1/6 of the deployed footprint.

Figure 7F:
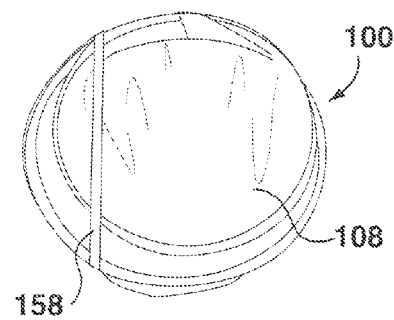
Figure 8:
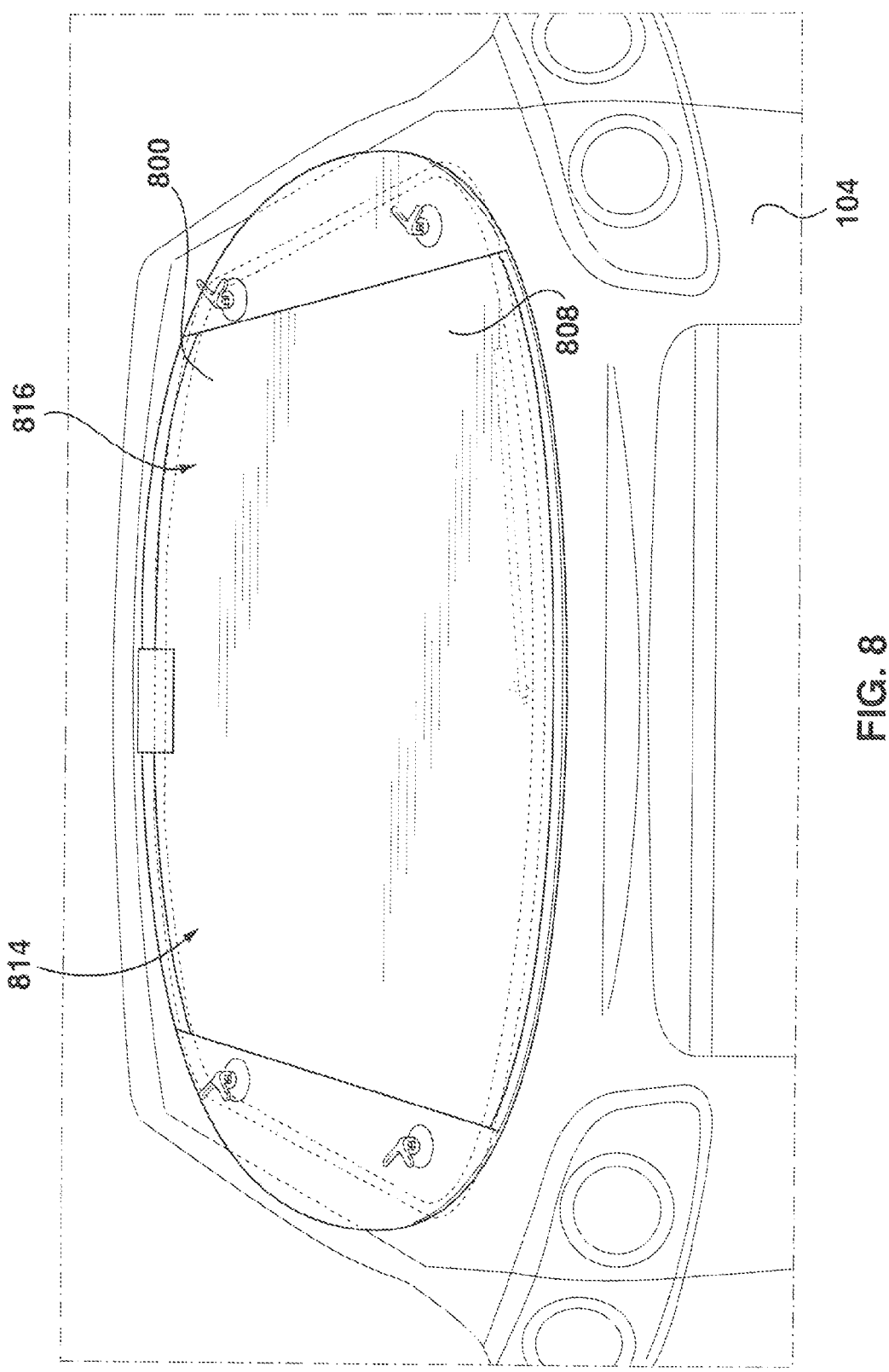
FIG. 8 is a rear view of the vehicle of FIG. 1, with an alternative protection device secured to a rear window of the vehicle.
Figure 9:
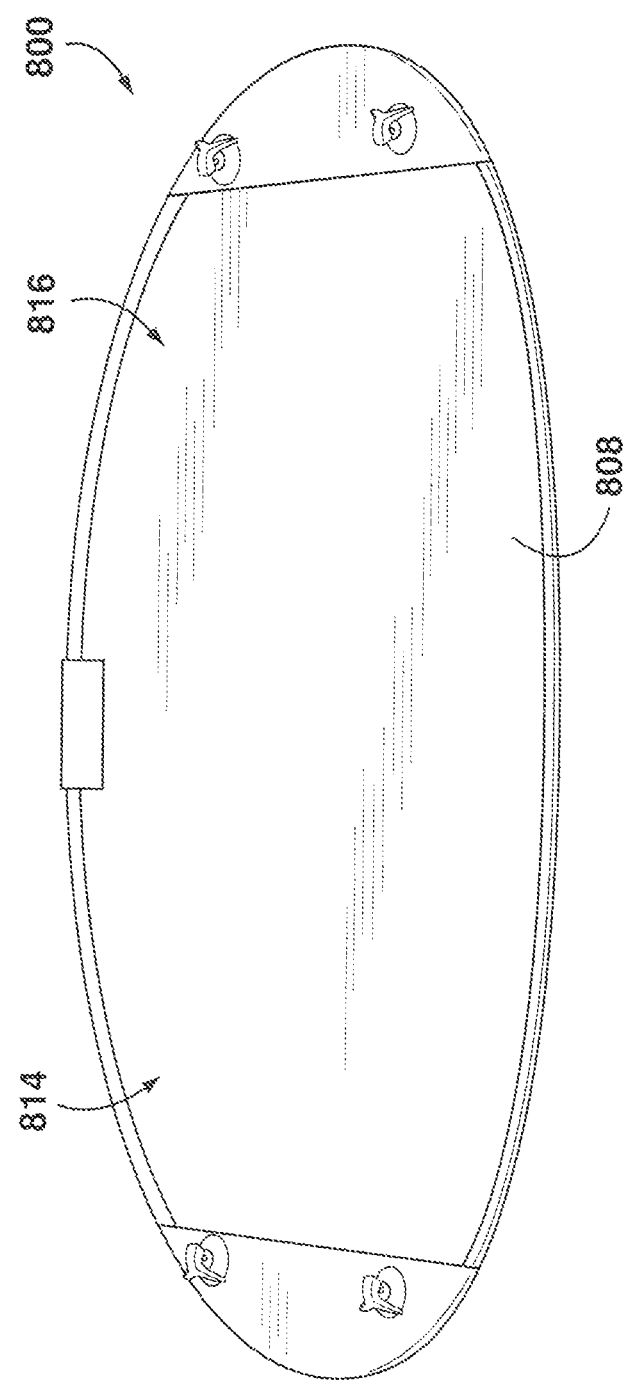
FIG. 9 is a perspective view of the protection device of FIG. 8.
Figure 10:
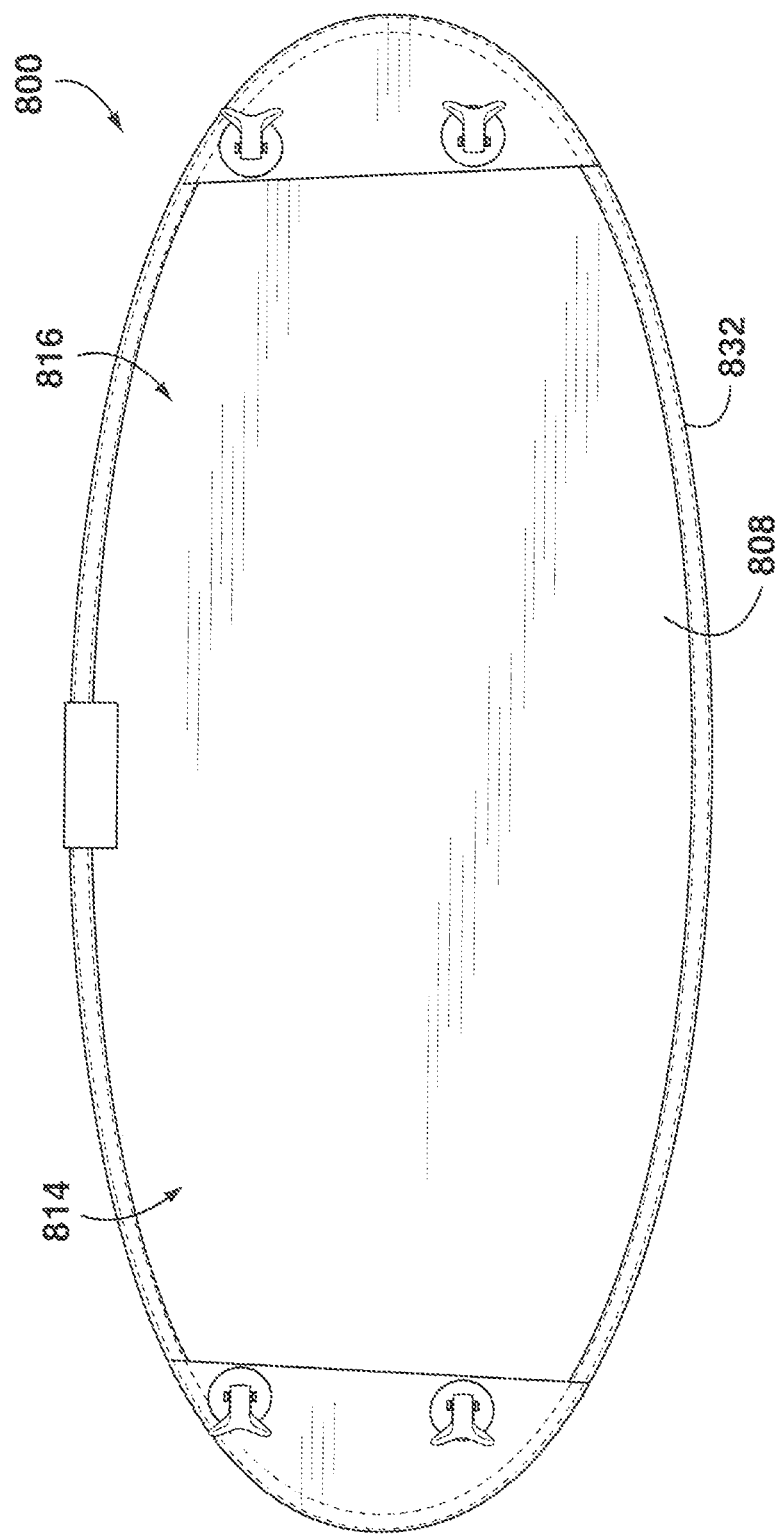
FIG. 10 is a front plan view of the protection device of FIG. 9.
Figure 11:
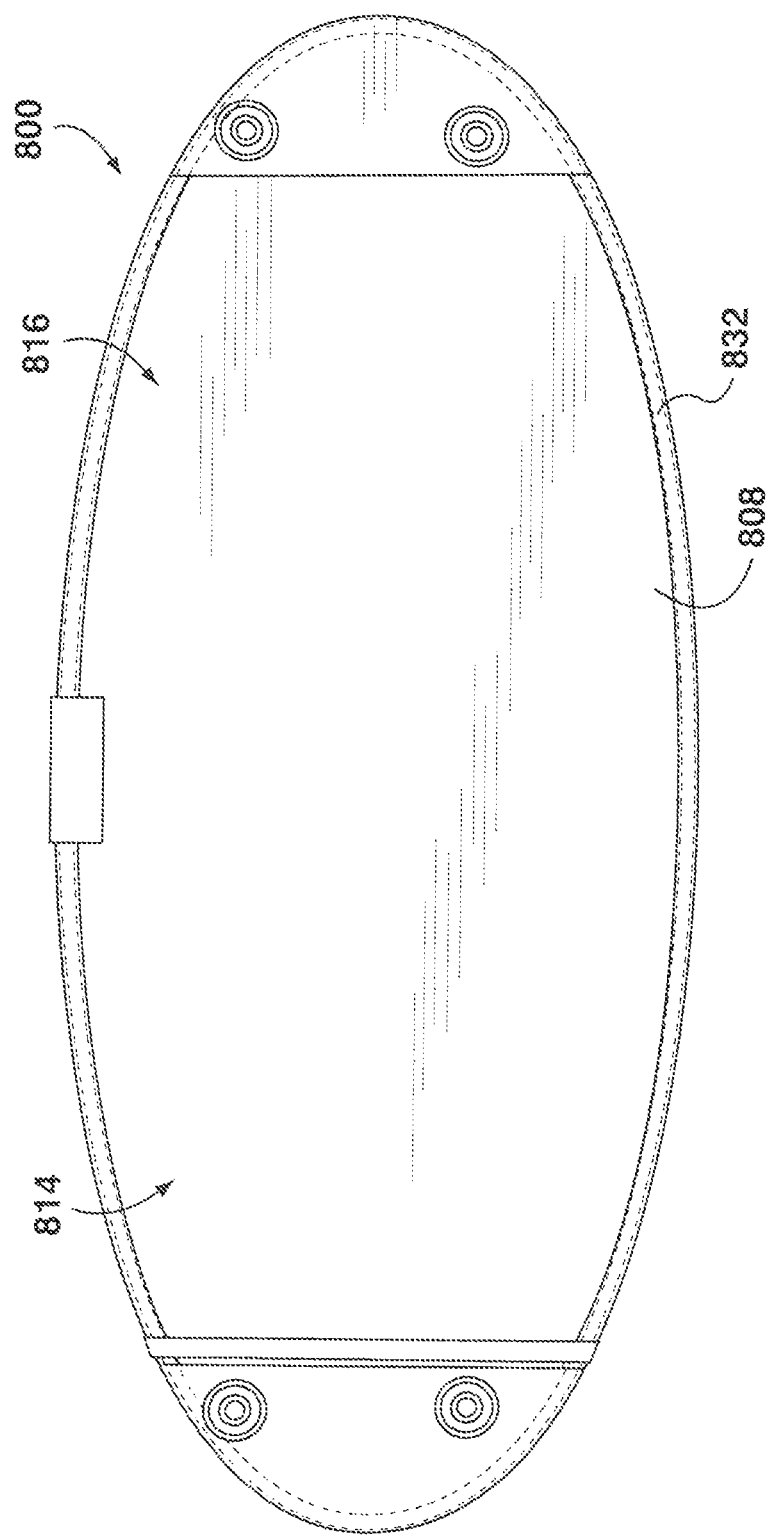
FIG. 11 is a rear plan view of the protection device of FIG. 10.

The device 100 may include a lock for securing the frame 110 in the storage state. Referring back to FIG. 5, in the example shown, the lock includes an elastic strap 158 that is attached to the cover 108. The strap 158 is attached to the inside face 128 of the cover 108, so that in use, it faces the window 102 and is protected from environmental conditions. Referring to FIG. 7F, the strap 158 may be positioned over the cover 108 and frame 110 when the frame 110 and cover 108 have been collapsed, to hold the device 100 in the storage state. As the frame 110 is resiliently flexible, when the strap 158 is removed, the frame 110 may pop-up, and thereby automatically reconfigure towards the deployed state. More specifically, in the example shown, the frame 110 will automatically pop-up to the state shown in FIG. 7B. The device 100 may then be manually unfolded at the frameless central portion 146, back to a generally flat state.

As noted above, the device 100 includes a plurality of fasteners 112 secured to the cover 108 for mounting the device 100 to the window 102 (only one of the fasteners is labelled in the figures). Referring back to FIGS. 2 to 5, in the example shown, each fastener 112 is a suction cup, and more specifically, is a locking suction cup 160. The cover 108 includes an inside face 128 (shown in FIG. 5) for facing the window 102 and an opposed outside face 164 (shown in FIGS. 2 to 4). The locking suction cups 160 are positioned in apertures extending through the cover 108, so that the suction cup portion 166 of the locking suction cup 160 is adjacent the inside face 128 and may be secured to the window 102, and the lock portion 168 of the locking suction cup 160 is adjacent the outside face 164 and may be accessed by a user.

The locking suction cups 160 may hold the cover 108 tightly and closely to the window, to thereby inhibit material such as snow from getting under the cover 108, and to inhibit blowing of the cover 108 by the wind.

In some examples, the locking suction cups 160 may include lift tabs, to facilitate removal from the windshield.

In the example shown, the device 100 includes four fasteners 112. In other examples, another number of fasteners 112 may be used, such as two, three, five, or six fasteners.

In the example shown, the locking suction cups 160 are positioned for mounting directly to the exterior surface 106 of the window 102. Specifically, the cover 108 has a periphery 170, and each locking suction cup 160 is positioned inwardly of the periphery 170, and within one of the first ring 136 and the second ring 138.

Furthermore, it has been determined that the locking suction cups 160 may hold more securely to the exterior surface 106 of the window 102 when the exterior surface 106 of the window 102 is generally clean and/or dry. In order to facilitate securing the locking suction cups 160 to a generally clean/dry portion of the window 102, the locking suction cups 160 may be positioned so that in use, at least some of the locking suction cups 160 are secured to a wiper sweep area on the exterior surface 106 of the window 102. More specifically, referring to FIG. 6, the vehicle 104 is provided with wipers 172 that wipe the front window 102. The wipers 172 generally wipe only a portion of the front window 102, and this portion may be referred to as a wiper sweep area, which is bounded by dotted line 174. The locking suction cups 160 may be positioned on the cover 108 so that when the device 100 is secured to the front window 102, at least some of the locking suction cups 160 (e.g. 2, 3, or 4 of the locking suction cups 160) are mounted to the wiper sweep area of the exterior surface 106 of the window 102. Accordingly, in use, a user may optionally engage the wipers 172 to clean/dry the front window 102, prior to securing the device 100 to the front window 102. This may allow for the locking suction cups 160 to hold more securely to the front window 102.

In alternative examples, other types of fasteners 112 may be used, and/or the fasteners 112 may be positioned elsewhere with respect to the cover 108. For example, the fasteners 112 may be positioned outboard of the periphery 170 of the cover 108.

Figure 6:
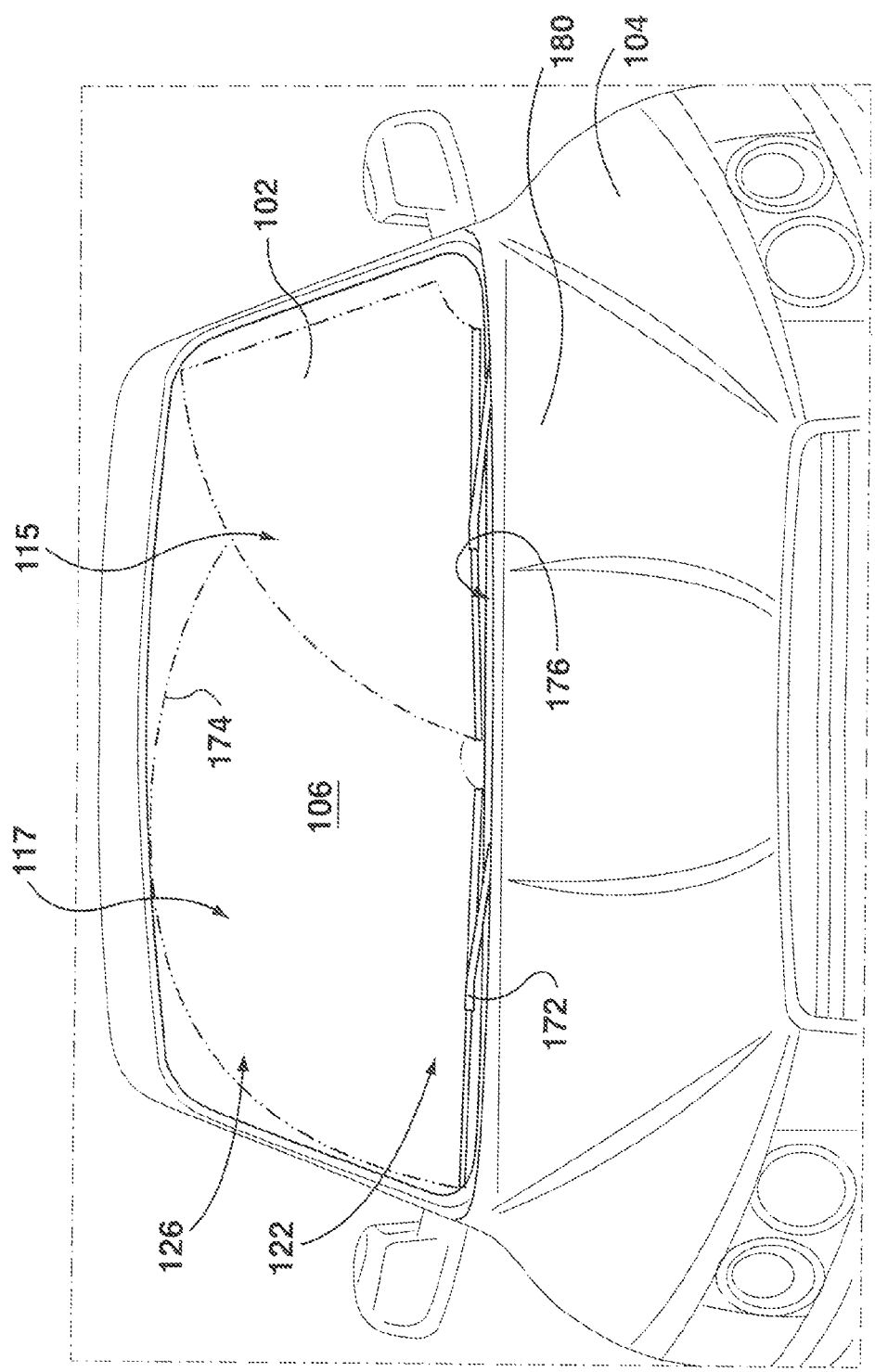
FIG. 6 is a front view of the vehicle of FIG. 1, showing the wipers and wiper well of the vehicle, and showing the wiper sweep area of the wipers in dotted line.

Referring still to FIG. 6, in the example shown, the vehicle 104 includes a vehicle wiper well 176, in which the wipers 172 are nested when not in use, and which houses the windshield washer fluid jets (not shown). The device 100 is configured so that in use, it covers the wiper well 176, and thereby may prevent, inhibit or reduce material such as snow and/or ice from building up in the wiper well 176 and freezing the wipers 172 and blocking the jets, as shown in FIG. 1. More specifically, the device 100 is sized and shaped so that in use, the bottom portion 178 (shown in FIG. 3) of the first frame member 132 is positioned below the wiper well 176, and the bottom portion 122 of the cover 108 covers the wiper well 176 to protect the wiper well 176 from environmental conditions.

In examples wherein the device 100 covers the wiper well 176, the bottom portion 178 of the first frame member 132 may be positioned adjacent the front hood 180 of the vehicle 104 (also referred to as the vehicle hood), and may contact the vehicle hood 180. This may in some instances cause damage to the vehicle hood 180, such as chips, scratches, or dents. Referring to FIG. 3, in the example shown, in order to protect the vehicle hood 180 from the bottom portion 178 of the first frame member 132, the device 100 further includes a shield 182 surrounding the frame member bottom portion 178 and shielding the vehicle hood 180 from the frame member bottom portion 178. In the example shown, the shield 182 includes a tubular plastic sheath in which the frame member bottom portion 178 is received.

An example method of mounting the device 100 to the window 102 will presently be described. In use, the device 100 may first be configured to the deployed state. For example, the strap 158 may be removed from around the collapsed device 100, so that the first 132 and second 134 frame members pop-up to a generally flat state. The cover 108 may then be unfolded along the frameless central portion 146, to configure the device 100 to the deployed state. Alternatively, the cover 108 may be unfolded at a later step, and may initially remain in the folded state during installation. The device 100 may then be placed over the window 102. For example, a user may stand adjacent the vehicle 104, hold the cover first side portion 114 or cover second side portion 116, and position the device 100 over the window 102. In the example shown, as the first 132 and second 134 frame members extend widthwise across the cover 108 and support the cover 108 in a generally flat state across the width of the cover 108, the device 100 may optionally be positioned over the window 102 in one motion, such as a single placing motion. That is, there may not necessarily be a need to reach over the window 102 to spread the device 100 across the width of the window 102. Furthermore, as the first 132 and second 134 frame members extend widthwise across the cover 108 and support the cover 108 in a generally flat state across the width of the cover 108, the device 100 may resist being blown by the wind towards the storage state when a user is holding it at the cover first side portion 114 or the cover second side portion 116. If the cover 108 has not already been unfolded, it may be unfolded after being placed over the window 102. When the device has been placed over the window, the locking suction cups 160 may be pressed to the window 102 and locked, to securely and removably mount the device 100 to the window 102.

In order to remove the device 100 from the window 102, the locking suction cups 160 may be unlocked, and the device 100 may be pulled from the window, optionally by gripping any lift tabs (not shown) on the suction cups. The device 100 may then optionally be collapsed to the storage state, as described above.

Referring now to FIGS. 8 to 11, an alternative protection device 800 (also referred to as "device 800") is shown. The device 800 is configured for protecting a rear window of the vehicle 104 from environmental conditions. The device 800 is similar to the device 100, but includes only a single resiliently flexible frame member 832 (shown in dotted line in FIGS. 10 and 11), which extends widthwise with respect to a cover 808 of the device 800, across at least a portion of a cover first side portion 814 and at least a portion of a cover second side portion 816 of the device 800.

In examples wherein the rear window includes a rear wiper, the device 800 may optionally be configured so that at least some of the suction cups of the device 800 are positioned within the wiper sweep area of the rear window.

While the above description provides examples of one or more processes or apparatuses, it will be appreciated that other processes or apparatuses may be within the scope of the accompanying claims.

The invention claimed is:

1. A protection device for protecting a window of a vehicle from environmental conditions, the protection device comprising:
   a) a water resistant cover for covering the window, the cover having a cover first side portion positionable to cover a driver's side of the window, and a cover second side portion opposed to the cover first side portion and positionable to cover a passenger's side of the window;
   b) a frame supporting the cover and comprising a resiliently flexible first frame member and a resiliently flexible second frame member spaced from the first frame member, the first frame member and second frame member each extending widthwise with respect to the cover across at least a majority of the cover first side portion and at least a majority of the cover second side portion, the frame collapsible to reconfigure the protection device from a deployed state wherein the frame supports the cover in a generally flat state to a storage state wherein the cover is folded; and c) a plurality of fasteners secured to the cover for mounting the protection device to the window.

2. The protection device of claim 1, wherein the cover has a cover bottom portion positionable to cover a bottom portion of the window and an opposed cover top portion positionable to cover a top portion of the window, the first frame member is secured to the cover bottom portion, and the second frame member is secured to the cover top portion.

3. The protection device of claim 2, wherein the first frame member and second frame member are spaced apart in a direction transverse to a direction of a width of the cover.

4. The protection device of claim 1, wherein the first frame member comprises a first ring extending widthwise with respect to the cover across at least the majority of the cover first side portion and at least the majority of the cover second side portion, and the second frame member comprises a second ring extending widthwise with respect to the cover across at least the majority of the cover first side portion and at least the majority of the cover second side portion.

5. The protection device of claim 1, wherein the first frame member and second frame member each extend widthwise across substantially the entirety of the cover first side portion and substantially the entirety of the cover second side portion.

6. The protection device of claim 1, wherein:
a) the cover has a cover maximum width, the first frame member has a first frame member width, and the second frame member has a second frame member width; and
b) the first frame member width and second frame member width are at least 75% of the cover maximum width.

7. The protection device of claim 6, wherein the first frame member width is at least 90% of the cover maximum width.

8. The protection device of claim 4, wherein the first ring and second ring are oval.

9. The protection device of claim 8, wherein the first ring and second ring are fabricated from steel.

10. The protection device of claim 9, wherein the steel of the first ring and second ring has a diameter of at least $1/16^{th}$ of an inch.

11. The protection device of claim 1, wherein the cover comprises a frameless central portion between the first frame member and the second frame member, and the cover is foldable at the frameless central portion so that the first frame member lies on the second frame member.

12. The protection device of claim 11, wherein the protection device is reconfigurable from the deployed state by folding the cover at the frameless central portion so that the first frame member lies on the second frame member, and twisting the frame into a plurality of stacked loops.

13. The protection device of claim 1, wherein the cover is generally continuous and comprises a plurality of panels.

14. The protection device of claim 1, wherein the cover comprises an inside face for facing the window, and the inside face comprises a heat reflective material.

15. The protection device of claim 13 wherein at least one of the panels is fabricated from nylon.

16. The protection device of claim 1, further comprising a lock for securing the frame in the storage state.

17. The protection device of claim 16, wherein when the lock is removed, the frame automatically configures towards the deployed state.

18. The protection device of claim 1, wherein the cover comprises a first sleeve in which the first frame member is received, and a second sleeve in which the second frame member is received.

19. The protection device of claim 1, wherein:
a) the first frame member comprises a frame member bottom portion positionable adjacent a hood of the vehicle, and
b) the protection device further comprises a shield surrounding the frame member bottom portion for shielding the hood from the frame member bottom portion.

20. The protection device of claim 19, wherein the shield comprises a plastic sheath in which the frame member bottom portion is received.

21. The protection device of claim 1, wherein the fasteners are suction cups securable to the window.

22. The protection device of claim 21, wherein the cover has a periphery, and the suction cups are spaced inwardly of the periphery for mounting directly to an exterior surface of the window.

23. The protection device of claim 22, wherein the suction cups are locking suction cups.

24. The protection device of claim 21, wherein the first frame member comprises a first ring, the second frame member comprises a second ring, and each suction cup is positioned within one of the first ring and the second ring.

25. The protection device of claim 1, wherein the frame is twistable into a plurality of stacked loops to reconfigure the frame from the deployed state to the storage state.

26. The protection device of claim 25, wherein the protection device has a deployed footprint when in the deployed state, and a storage footprint when in the storage state, and the storage footprint is about $1/6$ of the deployed footprint.

27. A combination comprising:
a) a window of a vehicle, the window having a window driver's side, a window passenger's side opposed to the window driver's side in a widthwise direction, and a window exterior surface; and
b) a protection device mounted to the window and protecting the window exterior surface from environmental conditions, the protection device comprising:
i) a water resistant cover covering the window;
ii) a frame supporting the cover and comprising a resiliently flexible first frame member and a resiliently flexible second frame member spaced from the first frame member, the first frame member and the second frame member each extending widthwise with respect to the cover across at least a portion of the window passenger's side and at least a portion of the window driver's side; and
iii) a plurality of fasteners secured to the cover and mounting the protection device to the window.

28. The combination of claim 27, wherein the first frame member extends across a majority of the window passenger's side and a majority of the window driver's side.

29. The combination of claim 27, wherein the first frame member extends across an entirety of the window passenger's side and an entirety of the window driver's side.

30. The combination of claim 27, wherein the cover is generally continuous.

31. The combination of claim 27, wherein:
a) the combination further comprises a vehicle hood;
b) the first frame member comprises a frame member bottom portion positionable adjacent the vehicle hood; and
c) the protection device further comprises a shield surrounding the frame member bottom portion and shielding the vehicle hood from the frame member bottom portion.

32. The combination of claim 27, wherein
a) the combination further comprises a vehicle wiper well;
b) the first frame member comprises a frame member bottom portion positionable below the vehicle wiper well, and
c) the cover comprises a cover bottom portion protecting the vehicle wiper well from environmental conditions.

33. The combination of claim 27, wherein the protection device is mounted directly to the window exterior surface.

34. The combination of claim 27, wherein the fasteners comprise suction cups mounting the protection device directly to the window exterior surface.

35. A combination comprising:
a) a window of a vehicle, the window having an exterior surface;
b) at least one wiper for wiping the window, the wiper defining a wiper sweep area on the exterior surface of the window; and
c) a protection device mounted to the window for protecting the window from environmental conditions, the protection device comprising:
  i) a water resistant cover covering the window, the cover comprising a cover first side portion positionable to cover a driver's side of the window, and a cover second side portion opposed to the cover first side portion and positionable to cover a passenger's side of the window;
  ii) a frame secured to the cover and supporting the cover, wherein the frame comprises a plurality of rings, and each ring extends widthwise with respect to the cover across at least a majority of the cover first side portion and at least a portion of the cover second side portion; and
  iii) a plurality of suction cups secured to the cover and mounting the protection device to the exterior surface of the window, wherein each suction cup is positioned within one of the rings, and at least some of the suction cups mounted to the wiper sweep area of the window.

36. The combination of claim 35, wherein each of the rings is resiliently flexible.

37. The combination of claim 35, wherein the frame is collapsible to reconfigure the protection device from a deployed state wherein the cover is generally flat to a storage state wherein the cover is folded.

38. The combination of claim 35, wherein the suction cups are locking suction cups.

39. A protection device for protecting a window of a vehicle from environmental conditions, the protection device comprising:
a) a water resistant cover for covering the window, the cover having a cover first side portion positionable to cover a driver's side of the window, a cover second side portion opposed to the cover first side portion and positionable to cover a passenger's side of the window, a cover bottom portion positionable to cover a bottom portion of the window, an opposed cover top portion positionable to cover a top portion of the window, and a cover periphery;
b) a frame supporting the cover and comprising a resiliently flexible first ring and a resiliently flexible second ring, the first ring and second ring each extending widthwise with respect to the cover across at least a majority of the cover first side portion and at least a majority of the cover second side portion, the first ring secured to the cover bottom portion, and the second ring secured to the cover top portion, and the frame collapsible to reconfigure the protection device from a deployed state wherein the frame supports the cover in generally flat state to a storage state wherein the cover is folded; and
c) a plurality of suction cups secured to the cover for mounting the protection device to the window, the suction cups positioned within the periphery of the cover.

* * * * *